Aug. 4, 1970     A. C. HOWELL ET AL     3,523,236
CIRCUIT TO CONTROL INVERTER SWITCHING FOR REDUCED HARMONICS
Filed Dec. 13, 1968     8 Sheets-Sheet 1
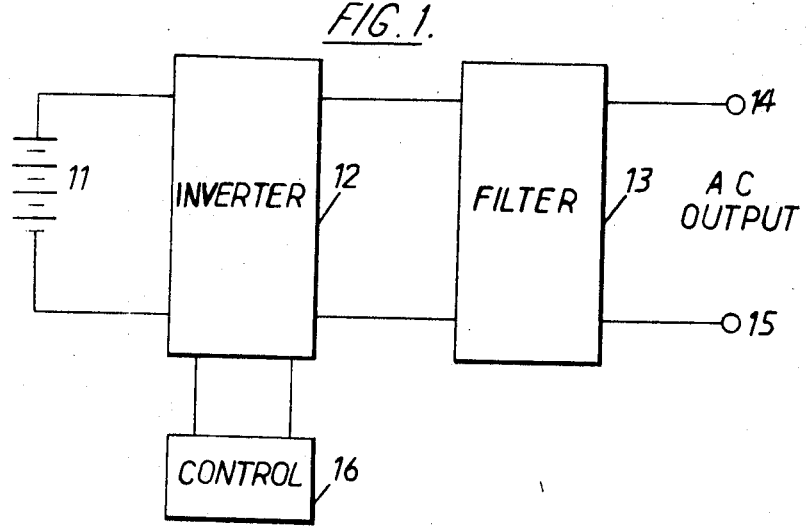
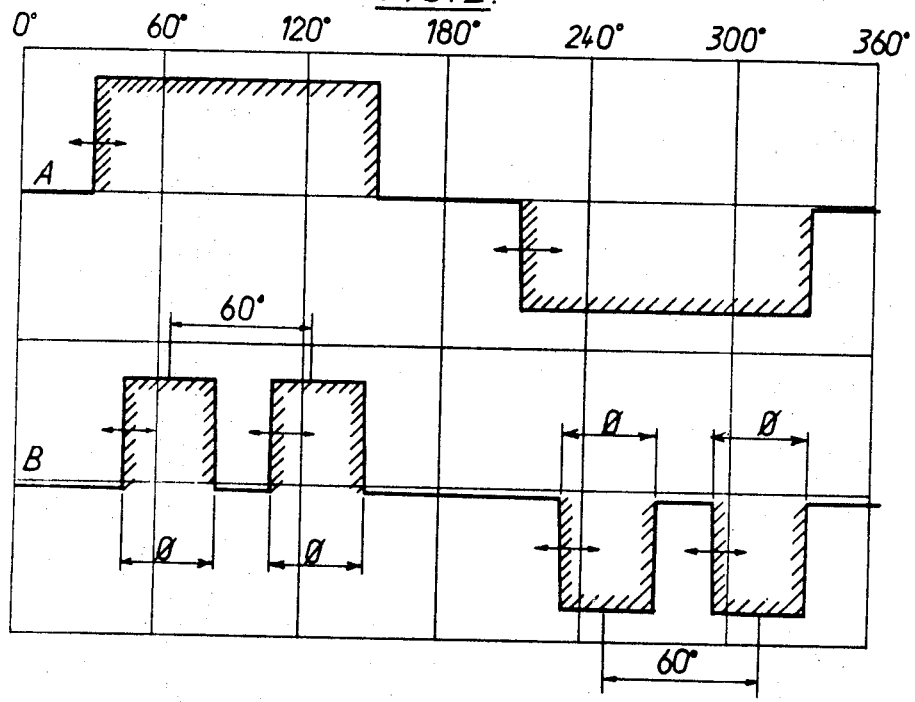
Inventor
A.C. HOWELL
C.B.R. WALKER
Attorney

TO FILTER 13

Inventor
A.C. HOWELL
C.B.R. WALKER
Attorney

INVENTORS.
A.C. HOWELL
C.B.R. WALKER
BY
ATTORNEY

United States Patent Office 3,523,236
Patented Aug. 4, 1970

3,523,236
CIRCUIT TO CONTROL INVERTER SWITCHING
FOR REDUCED HARMONICS
Antony Charles Howell, Marrickville West, New South
Wales, and Christopher Burcham Ridley Walker,
Coogee, New South Wales, Australia, assignors to International Standard Electric Corporation, New York,
N.Y., a corporation of Delaware
Filed Dec. 13, 1968, Ser. No. 783,583
Int. Cl. H02m 1/12
U.S. Cl. 321—9          3 Claims

ABSTRACT OF THE DISCLOSURE

The invention includes an inverter which supplies a series of rectangular voltage pulses of constant amplitude to a low pass filter. An A.C. output relatively pure in fundamental is produced by generating a pulse series which has no second, third, or fourth harmonics. The pulses are produced in pairs. Alternate pairs are produced which are of opposite polarities. All the pulses are of the same time width. When the first pulse in a pair is spaced 180 electrical degrees from the first pulse in the next succeeding pair and the second pulses in the same pairs are also 180 degrees apart, the even harmonics are eliminated. When all the pulse pairs are spaced 60 degrees apart, the third harmonic is eliminated with all harmonics that are a multiple of three. It is also a feature of the invention that the pulses have a variable time width. This makes it possible to vary the amplitude of the fundamental.

BACKGROUND OF THE INVENTION

This invention relates to devices for producing an A.C. output signal from a D.C. source of potential, and more particularly to static inverter systems.

In the past, conventional inverters have had a rather large scope of application. The present invention likewise has a broad scope of application and is not to be limited to those applications disclosed herein. However, the invention will be found useful in supplying an adjustable A.C. output voltage to control the speed of a three-phase or other multi-phase motor.

It is old in the prior art to regulate the output of inverter systems, in particular those using circuits of the static switch bridge type, by controlling the periods of conduction of the various arms of the bridge circuit. However, the outputs of these inverter systems have several disadvantages, either singly or in combination. For example, the output of a conventional inverter often contains harmonics which are a multiple of two or three times the desired fundamental output. This problem cannot be solved without expensive filtering. Further the output voltage of conventional inverters cannot be controlled down to zero or near zero. The output also frequently requires some form of transformer circuit to effect a form of vector addition to control the output or to remove harmonics. Still further, the output in the case of a three-phase arrangement, cannot directly form a three-phase system because of third harmonic circulating currents. Conventional inverters also require a relatively high switching frequency to obtain a suitable output. This results in a considerable energy loss and stress on the commutating components.

SUMMARY OF THE INVENTION

In accordance with the system of the present invention, the above-described and other disadvantages of the prior art are overcome by providing means to produce certain pulse pairs of alternate polarities. These pulses are generated in such a way that second, third, and fourth harmonics are eliminated.

In contrast to the prior art, the inverter system of the present invention gives an output that is free of second, third, and fourth harmonics. Further, the amplitude of the fundamental may be continuously varied down to zero. Also, when used in a three phase arrangement, the invention does not introduce any third harmonic circulating currents and is thus suitable for driving three phase motors and the like. Only a small amount of filtering is required to remove higher order harmonics. The control switching frequency is at least three times the fundamental frequency and therefore, the speed of response is limited to only ⅓ cycle, rather than one cycle or ½ cycle in the usual known types of circuit. Because the output can be controlled down to zero by varying all pulse widths simultaneously without introducing second, third, or fourth harmonics, current limiting can be applied without causing waveform deterioration.

It is also a special feature of the invention that the amplitude of the fundamental may be varied down to zero varying the pulse widths.

The above-described and other advantages of the present invention will be better understood from the following description when considered in connection with the accompanying drawings.

BRIEF DESCRIPTION OF THE DRAWINGS

In the drawings, which are to be regarded as merely illustrative:

FIG. 1 is a block diagram of the essential components of an inverter system;

FIG. 2 is a graph of a group of wave-forms used in explaining the invention;

DESCRIPTION OF THE PREFERRED EMBODIMENT

Figure 3:
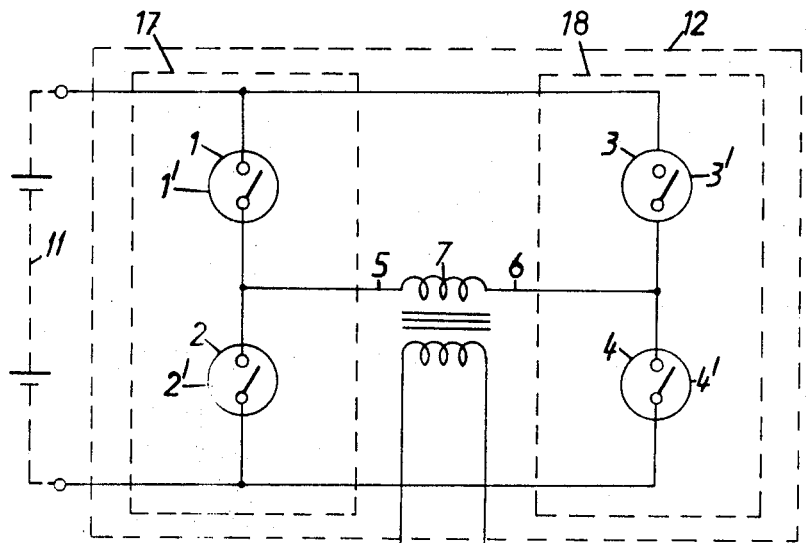
FIG. 3 is a diagram of the preferred form of an inverter shown in FIG. 1, using static switches in a bridge configuration.

FIG. 1 shows in block diagram form the essential parts of a D.C. to A.C. inverter system. The D.C. source 11 is connected to an inverter 12 whose output is taken by way of a filter 13 to the A.C. output terminals 14, 15. The inverter 12 contains static switches, for example thyristors, which are operated in a desired sequence under the control of the control means 16. By providing suitable means in the control means 16, it is possible to vary the output voltage. Although not shown, it is possible to compare the output voltage with a reference voltage and use the difference voltage to control the control means 16 so as to provide automatic voltage control.

Known inverters of this type are operated so as to provide a rectangular wave output, or a quasi-rectangular wave output something like that shown in FIG. 2A. Referring to FIG. 2A, it will be seen that it shows a quasi-rectangular wave that is symmetrical. Because the wave is symmetrical, second harmonics are absent in the output. In the wave shown, each positive and negative half-wave extends over 120 electrical degrees, and in this case, the third harmonic component also is substantially eliminated.

In practice, however, the wave form produced by conventional inverters, is not as shown in FIG. 2A because the duration of each half wave or pulse is varied in order to vary the voltage output. This is indicated diagrammatically by the double-headed arrows on the leading edges of the pulses. As soon as the duration of the half-waves varies from 120°, substantial third harmonic components are introduced into the output, resulting in the disadvantages previously mentioned.

The inverter of the present invention may be operated so as to produce an output having the type of wave-form shown in FIG. 2B. This again is a symmetrical wave, but each positive and negative half wave is made up of two rectangular pulses separated, center to center, by 60°. The duration and amplitude of all pulses are equal. The duration is represented by the angle $\phi$. The first pulse in each pair is located 180 degrees apart center to center. The second pulse in each pair is also located 180 degrees apart, center to center.

A fourier analysis of the wave of FIG. 2B will reveal that the only harmonics present are the fundamental and the fifth and those given by the formulas $1+6n$ and $5+6n$, where $n=1, 2, 3$, etc.

Thus, the harmonics given by the formula $1+6n$ plus the fundamental are 1, 7, 13, 19, 25, etc. The harmonics given by the formula $5-6n$ plus the fifth are 5, 11, 17, 23, 29, etc. In order, the harmonics altogether are 1, 5, 7, 11, 13, 17, 19, etc. Note will be taken that all even harmonics (a multiple of 2) are missing. Further, all harmonics which are a multiple of 3 are missing. The output filter thus does not have to discriminate against the second, third, or fourth harmonics.

It is important to note that the analysis reveals that the even harmonics and those which are a multiple of three, have a zero amplitude regardless of the value of $\phi$ between zero and sixty degrees.

The selection of an operating point as near $\phi=60$ degrees as possible may help in reducing the amplitude of the fifth harmonic; however, $\phi$ should be less than 60 degrees to allow for switching times and the maximum variation of $\phi$. Further, elimination of the multiple 2 and multiple 3 harmonics makes it unnecessary to limit $\phi$ to any value substantially between zero and 60 degrees. In other words, $\phi$ may vary over substantially the entire range between zero and 60 degrees. However, it is interesting to note that the amplitudes of some harmonics go to zero for certain operating points. For example, the seventh harmonic disappears at about $\phi=51$ degrees and the eleventh harmonic disappears at about $\phi=33$ degrees.

The phrase, "time between pulses" as used herein, means the time between pulse centers. It is assumed that all pulses are of equal amplitude and time width.

There are two alternative conditions which will eliminate all multiple 2 harmonics. These conditions are as follows:

(a) The time between pulse pairs is 90 degrees;

(b) The time between the first pulse of each consecutive pair is 180 degrees and the time between the second pulse of each consecutive pair is 180 degrees.

There are two alternative conditions which will eliminate all multiple 3 harmonics as follows:

(c) The time between pulses is 60 degrees;

(d) The time between the first pulse of a first pair and the last pulse of the next succeeding second pair is 240 degrees and the time between the second pulse of the first pair and the first pulse of the second pair is 120 degrees.

Note will be taken that the waveform of FIG. 2B meets all the conditions of (b), (c), and (d). Multiple 2 and multiple 3 harmonics are thus both eliminated.

While each individual rectangular wave form may have third harmonics when two identical such wave forms are added at 60°, their third harmonic content will cancel out since 60° represents half of a cycle of the third harmonic.

As mentioned previously, the inverter 12 utilizes static switches for performing the switching operation. The preferred form of inverter is one in which the switches are connected in a bridge configuration, as shown in FIG. 3. Here, the inverter 12 consists of two half-wave modules 17, 18 each connected across the D.C. source and each including two switches 1, 2 and 3, 4, respectively. The A.C. output is taken across the other diagonal of the bridge between points 5 and 6 by means of the transformer 7. Each half-wave module may be built up as in FIG. 4, which shows the module 17. The switches 1, 2 and thyristors and their gates are brought out to the control leads 1', 2'. Commutation is provided by choke 19 and capacitors 20 and 21, and feedback of reactive energy is provided by diodes 22, 23. Both the bridge inverter and half-wave modules, as such, are well-known, and no further description is thought necessary.

To achieve the wave form of FIG. 2B, the switches 1 to 4 have to be switched according to the following table:

| Switching time | Timing Angle | Switches Fired | Switches On |
|---|---|---|---|
| 1 | 0° and 360° | 2 and 4 | 2 and 4. |
| 2 | 60° | 1 | 1 and 4. |
| 3 | 60°+$\phi$ | 3 | 1 and 3. |
| 4 | 120° | 4 | 1 and 4. |
| 5 | 120°−$\phi$ | 2 | 2 and 4. |
| 6 | 180° | 1 and 3 | 1 and 3. |
| 7 | 240° | 2 | 3 and 2. |
| 8 | 240°+$\phi$ | 4 | 4 and 2. |
| 9 | 300° | 3 | 3 and 2. |
| 10 | 300°+$\phi$ | 1 | 3 and 4. |

Assume that switches 2 and 4 are conducting at the end of a full cycle. There is then no current flow from the D.C. source through transformer 7 because switches 1 and 2 are off. At time 2 switch 1 is fired, and therefore the complementary switch 2 is switched off. There is then a path from the D.C. source through the transformer 7 by way of switch 1, transformer 7 and switch 2, which we will call the positive direction. This condition continues until time 3 when switch 3 is fired, turning off switch 4. There is now no path from the D.C. source through the transformer. At time 4 switch 4 is fired, turning switch 3 off and there is again a path from the D.C. source in the positive direction through switches 1 and 4. At time 5 switch 2 is fired, turning switch 1 off, and again there is no path from the D.C. source for the current. The switching at 180° is a half-cycle transition to prepare for the next half-cycle. Switches 1 and 3 are fired, accordingly switches 2 and 4 turn off, and again there is no current flow from the D.C. source. At time 7 switch 2 is fired, switch 1 turns off, and there is a path from the D.C. source from switch 3 through transformer 7, and then through switch 2. The current flow through the transformer is now in the reevrse direction to previously, which we will call the negative direction. The operation for the rest of the cycle will be obvious from the above.

Figure 5:
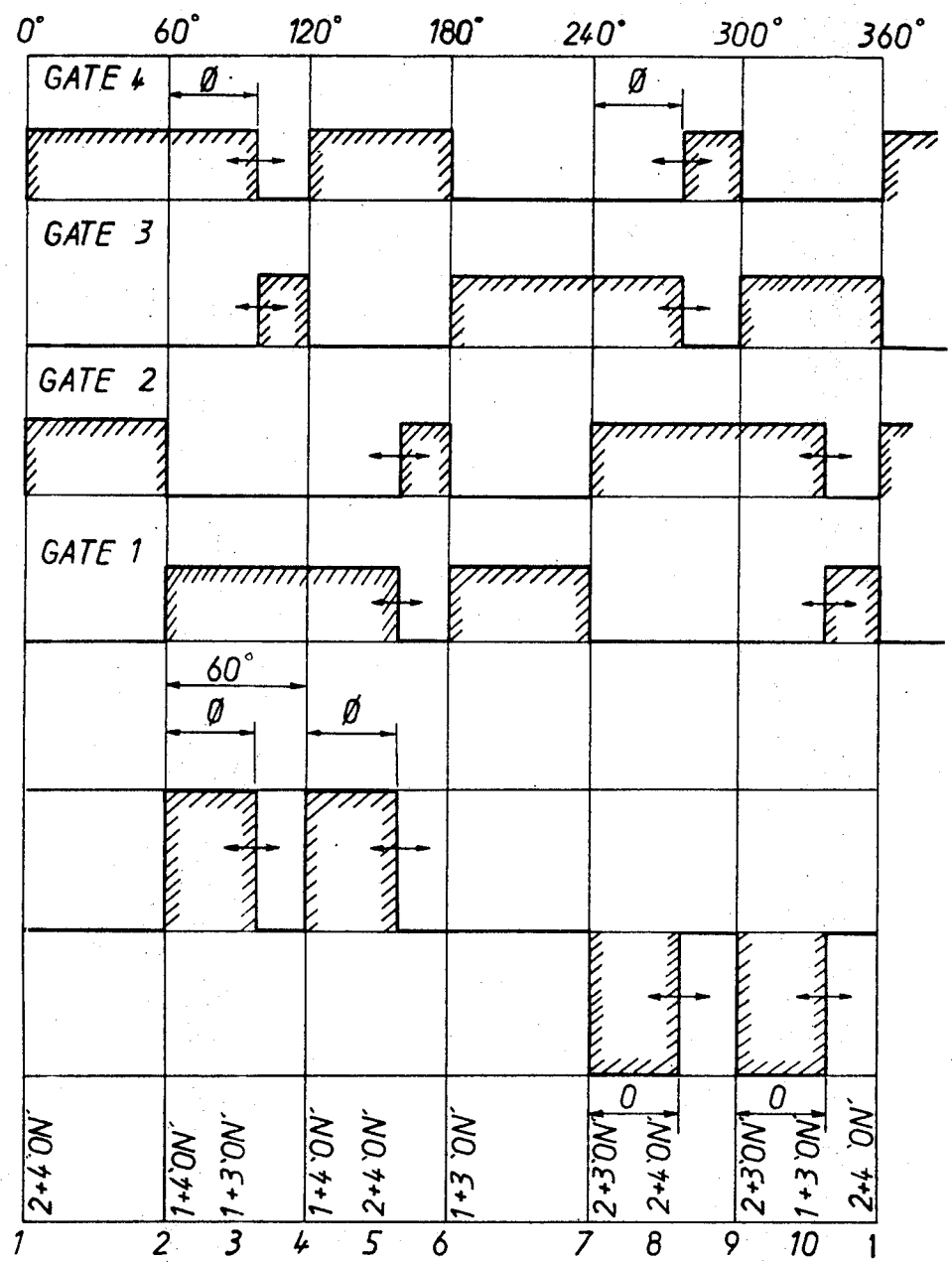
FIG. 5 is a graph of pulse wave forms fed to gates of switches shown in FIG. 3 when the inverter is operated according to the invention, and also a resultant output wave form.

Pulses to control the switches 1 to 4 are provided from the control means 16, and a suitable sequence of pulses is shown in FIG. 5. The first four lines labelled Gate 1 to Gate 4 show the wave forms for the pulses supplied to the respective gates, while the fifth line shows the output wave. So as to demonstrate how this figure should be read in comparison with the above table, it will be noted that at position 2, switch 1 is switched on, and therefore switch 2 turns off, while switch 4 remains on and switch 3 remains off: accordingly switches 1 and 4 conduct as set out in the table. At position 3 switch 1 remains on and switch 2 remains off, while switch 3 is switched on and switch 4 is turned off: switches 1 and 3 are on as in the table.

Figure 6:
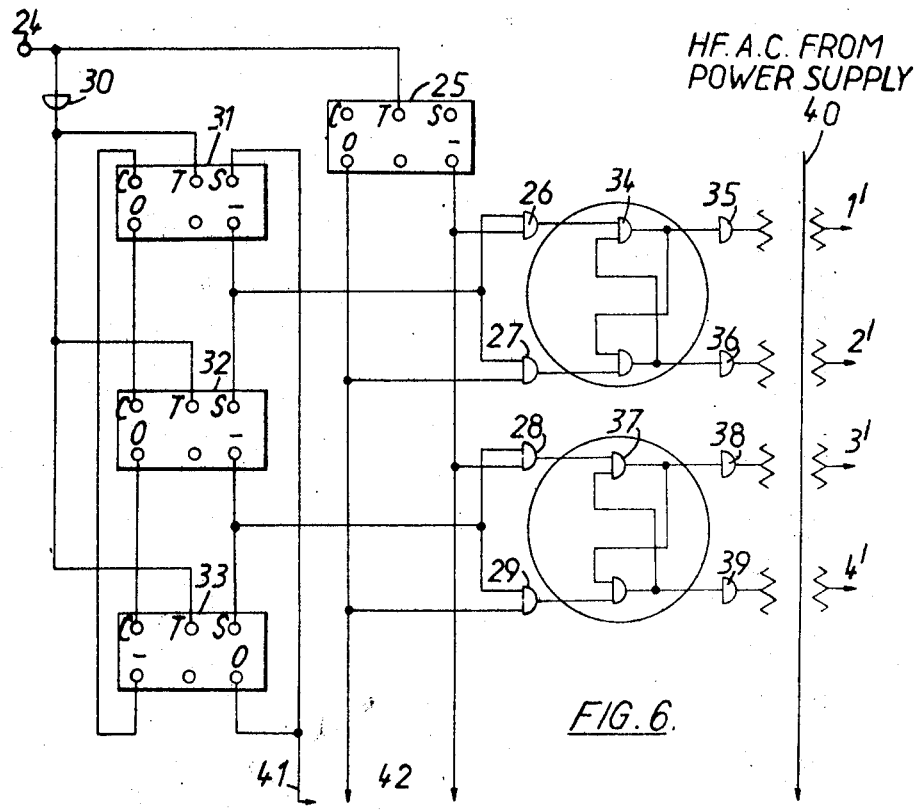
FIG. 6 is a diagram which shows pulse logic by which the switching wave forms of FIG. 5 are obtained, and a pulse transmission circuit controlled by the logic by which the pulses are generated.

Control means to produce the wave forms of FIG. 5 is shown in FIG. 6. Pulses having a variable mark-to-space ratio $r$ (where $0 < r < 1$) and a frequency of six times the fundamental are fed in at terminal 24 of this pulse logic. The pulses are fed directly to a negative triggered flip-flop 25 which provides square wave outputs at three times the fundamental frequency. This square wave output is fed to the gates 26 to 29.

The pulses at terminal 24 are also fed to an inverter 30 and then to a ring counter containing negative triggered flip-flop 31, 32, 33 so that each shift in the ring counter is triggered by positive going transitions of the input wave form. Outputs are taken from the ring counter and also fed to the gates 26 to 29. The output from gates 26 to 27 is fed to RS flip-flops 34 whose outputs are fed to pulse transmission gates 35, 36 which control the generation of the pulses applied to the gates 1', 2' of the inverter of FIG. 3. In a similar fashion the output from gates 28, 29 are fed to the flip-flops 37 which in turn control the gates 38, 39. The pulse supply to gate terminals 3', 4' of the inverter is under the control of these gates 38, 39. Leads 41, 42 indicate extension where more than one phase has to be provided for, e.g. in the three phase system. As mentioned above, the pulse input to the pulse logic of FIG. 6 has a variable mark-to-space ratio and the output voltage of the inverter is varied by varying this ratio.

Figure 7:
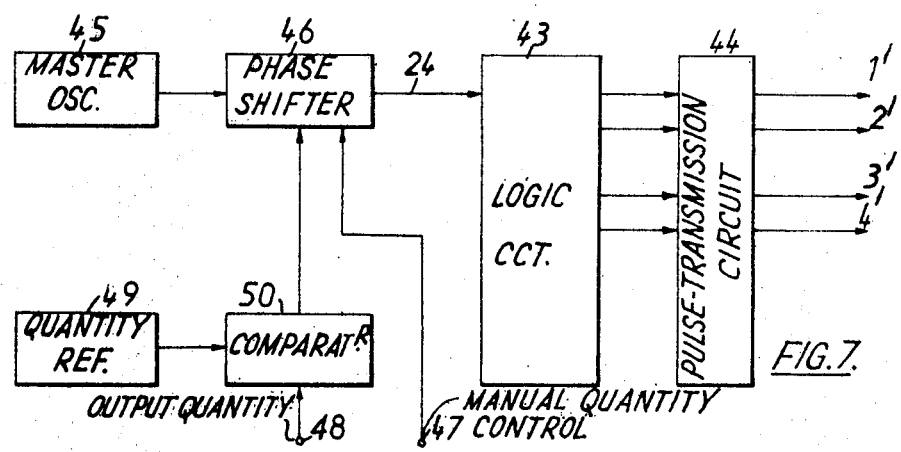
FIG. 7 is a block diagram of one form of control circuit for use in a single phase circuit which may be used in the inverter system of FIG. 1 and which uses the arrangement of FIG. 6.

FIG. 7 is a block diagram of one form which the control means 16 of FIG. 1 may take. The logic circuit and pulse transmission circuit of FIG. 6 is shown at 43 and 44. The master oscillator 45 operates at six times the fundamental frequency and feeds to the terminal 24 by way of a phase-shifter 46. The phase shifter is capable of producing a phase-shift variable between 0° and 60° referred to the fundamental. Manual control of the output voltage is provided by varying the phase shift introduced by phase-shifter 46, for example, by a voltage applied to terminal 47. Automatic voltage control is provided by comparing the output voltage, or a fraction of it, applied to terminal 48 with a reference voltage 49 in the comparator 50, and applying the error voltage to the phase shifter 46.

Figure 8:
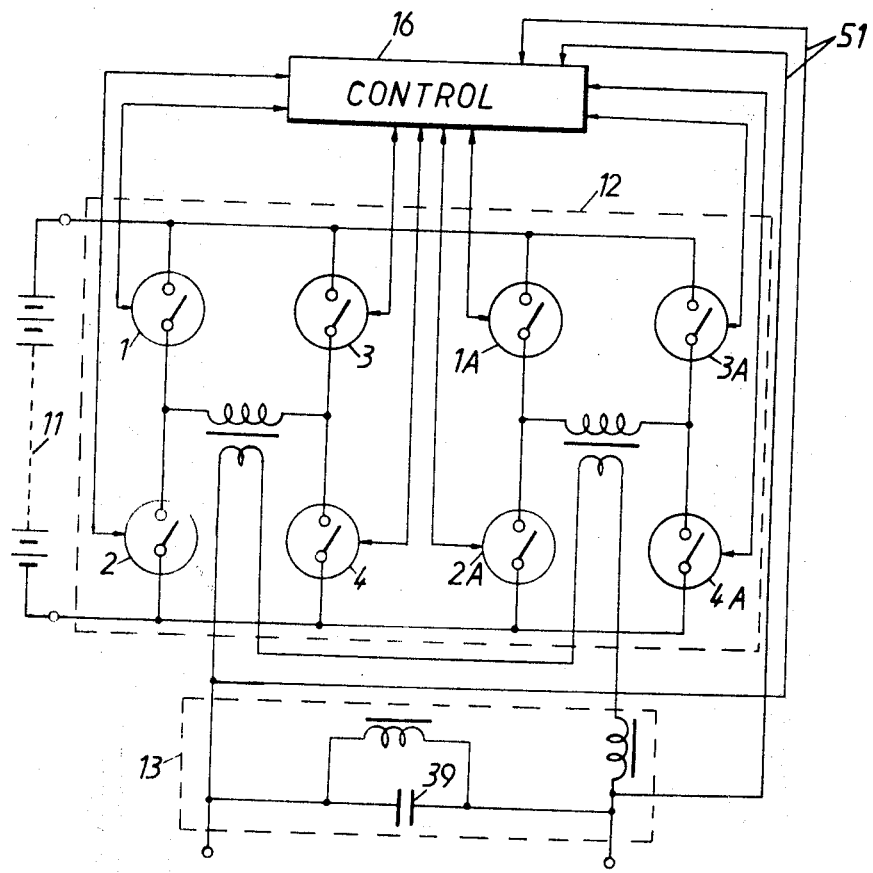
FIG. 8 is a further block diagram in which the fifth harmonic is also substantially eliminated.

FIG. 8 shows a further development of a single phase inverter according to the invention in which fifth harmonics are also substantially eliminated. Two bridge type switching circuits are provided, namely, bridge 1, 2, 3, 4 and bridge 1A, 2A, 3A, 4A. Bridge 1, 2, 3, 4 is operated as previously described with reference to FIGS. 2B and 3 to 7. Bridge 1A, 2A, 3A, 4A is operated in a similar fashion, but with a phase displacement of 36° with relation to bridge 1, 2, 3, 4. All harmonics being a multiple of five times the fundamental are thereby substantially eliminated, and the seventh harmonic reduced in output. Automatic voltage control is effected, as before, by a feedback connection 51.

Figure 4:
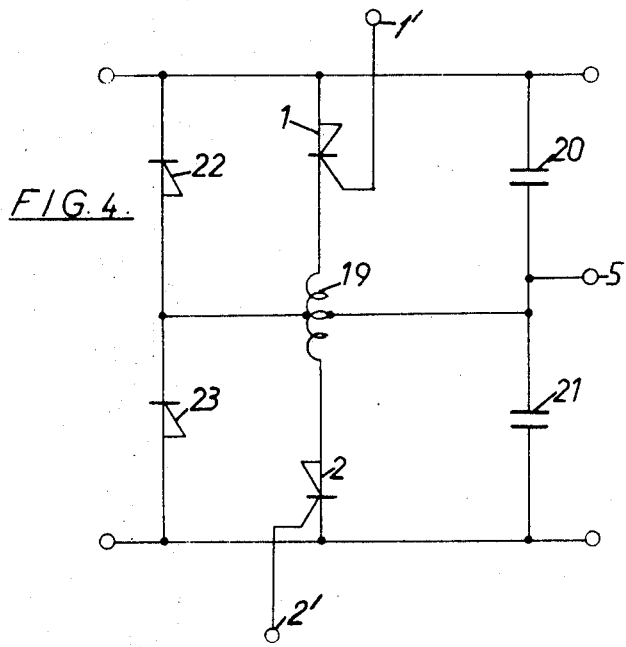
FIG. 4 is a circuit diagram of a half wave module which may be used in the bridge of FIG. 3.
Figure 9:
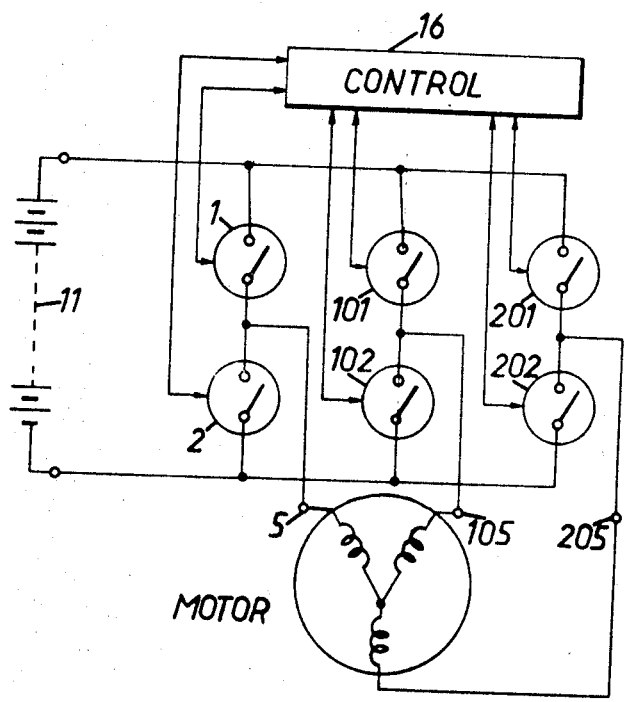
FIG. 9 is a diagram of a three-phase inverter system according to the invention supplying a three-phase motor.
Figure 10:
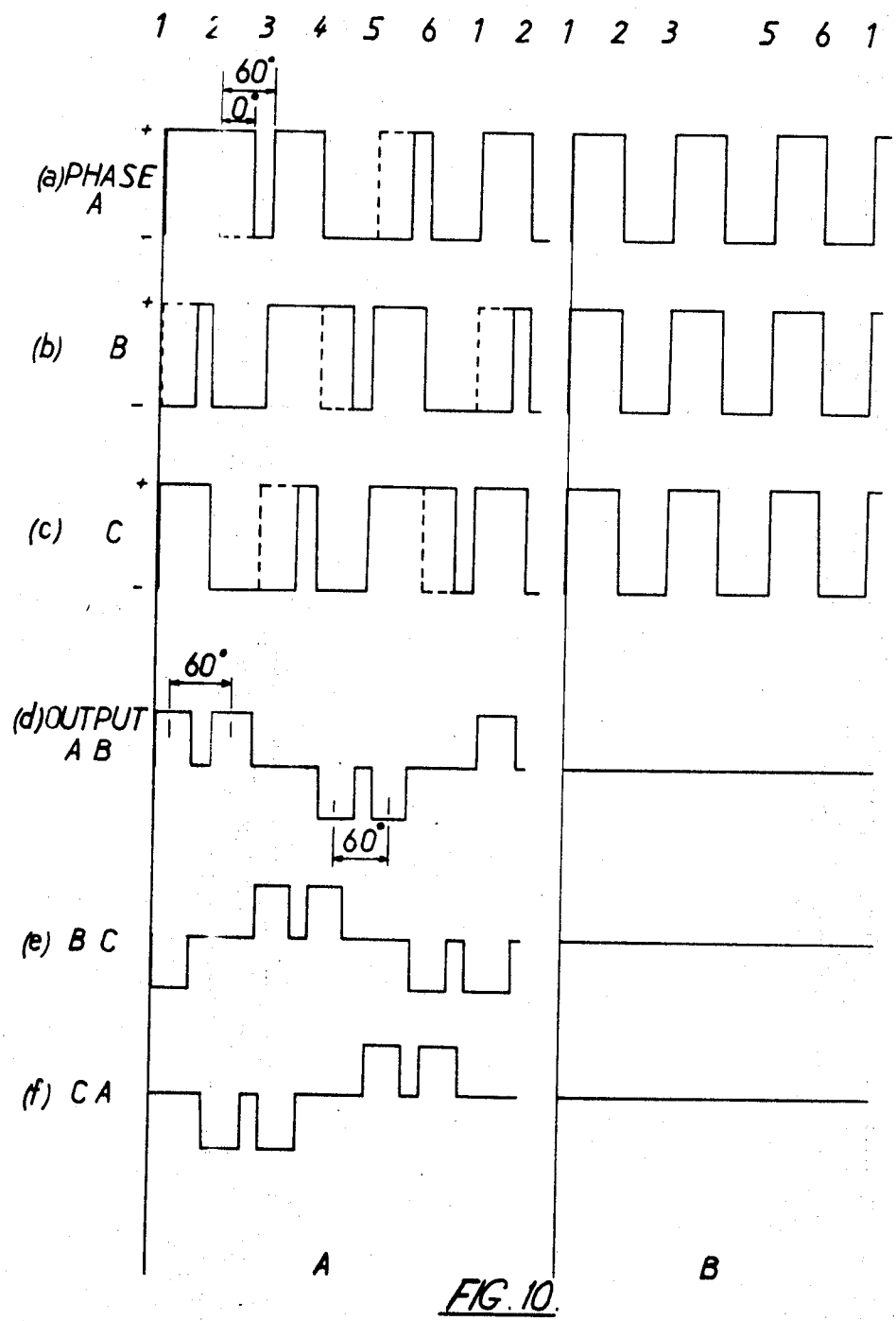
FIG. 10 is a graph of wave forms characteristic of the operation of the three-phase inverter system of FIG. 9; and, FIG. 11 is a block diagram of an alternative embodiment of the invention.

FIG. 9 shows a three-phase inverter system in accordance with this invention for applying a three phase motor with a variable voltage supply from a D.C. source 11. Three half wave modules 1, 2; 101, 102; and 201, 202 each similar to that of FIG. 4 are connected across the D.C. supply 11 and the junctions of the switches 5, 105 and 205 provide the three phase output which is taken to the three phase motor 52. The module 1, 2, may be identified as phase A, module 101, 102 as phase B, and module 201, 202 as phase C. The first three lines in FIG. 10 show the pulse wave form applied to, say, switches 1, 101, 201 in phases A, B and C, respectively. (The wave form of the pulses applied to the other switches 2, 102 and 202 will be the converse of those applied to switches 1, 101 and 201.) The phase outputs are shown in the lower three lines. The full line wave forms in FIG. 10A are for near maximum output with $\phi$ a substantial part of 60°. The dotted lines in the first three lines of FIG. 10A are for zero output, and this is reproduced again in full lines in the first three lines of FIG. 10B.

It will be noted that for zero output all three phases receive the same signals, so that the potential difference between the A.C. output terminals of any two phases is zero. This has been illustrated in FIG. 10$b$ $(d)$, $(e)$, and $(f)$.

Six switching transitions (numbered 1 to 6) occur during the fundamental output period and each switch in each phase conducts for the same total period during each fundamental output period. The conduction periods of all the switches are equal in the quiescent condition.

Now suppose that the signal applied to Phase A is modified so that transitions 2 and 5 are delayed 0° and similarly the signal applied to phase B is modified at the same time so that transitions 1 and 4 are delayed $\phi°$ and likewise phase C when transitions 3 and 6 are delayed $\phi°$, then the potential difference between any two phases becomes similar to that shown in FIG. 10A $(d)$, $(e)$, and $(f)$ which contain a substantial proportion of the desired fundamental output.

It will be noted that the output wave forms are symmetrical so that they contain no even harmonics and that they contain two identical parts phase displaced by 60° with respect to each other so that the output can contain no harmonics a multiple of 3 times the fundamental.

It will also be noted that the three outputs so formed constitute a three-phase system with phase angles 0°, 120°, 240°, respectively, and that by varying, the phase angle $\phi$ from 0 to 60° the fundamental output difference voltage may be varied from zero to approximately 87%, the fundamental content of a square wave output of the same amplitude and furthermore, the fundamental output is proportional to sin $\phi$ where $0° < \phi < 60°$ giving a useful degree of linearity between $\phi$ and the fundamental output quantity.

Figure 11:
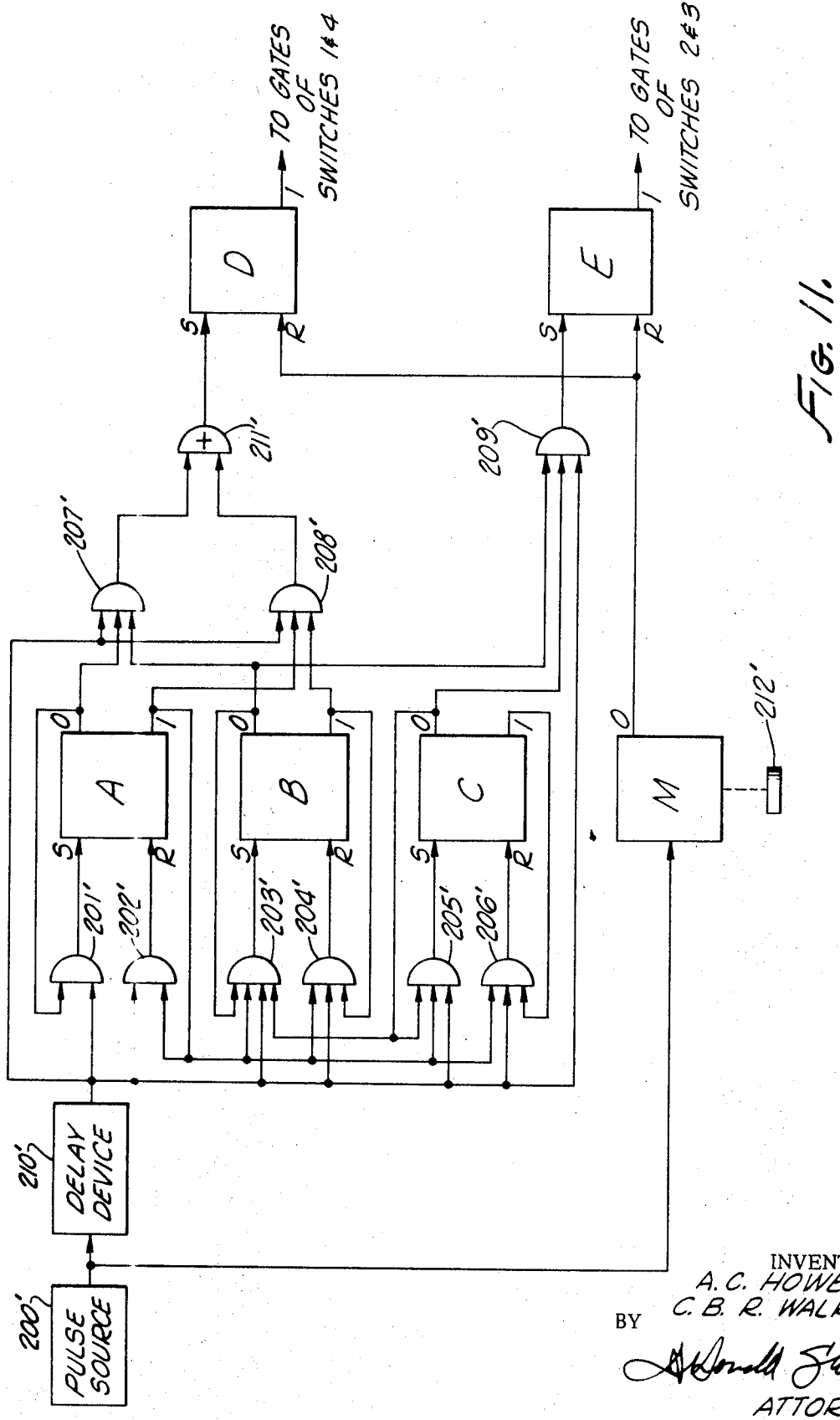

An alternative embodiment of the invention for gating on switches 1, 2, 3, and 4, shown in FIG. 3 is shown in FIG. 11. In FIG. 11 a pulse source 200' supplies a series of pulses at a constant repetition frequency. The output pulse of source 200' is supplied directly to a mono-stable multivibrator M. Output pulse of source 200' is then impressed upon gates 201', 202', 203', 204', 205', 206', 207', 208', and 209' through a delay device 210'. Gates 201' through 206' are connected to three flip-flops A, B, and C, which acts as a binary counter, counting according to the following table:

| Period | A | B | C |
| --- | --- | --- | --- |
| 1 | 0 | 0 | 0 |
| 2 | 1 | 0 | 0 |
| 3 | 0 | 1 | 0 |
| 4 | 1 | 1 | 0 |
| 5 | 0 | 0 | 1 |
| 6 | 1 | 0 | 1 |

The outputs of flip-flop A, B, C and the output of delay device 210' are impressed upon gates 207', 208', and 209'. The output of gates 207' and 208 are impressed upon a gate 211'. The output of gate 211' sets flip-flop D, which turns on switches 1 and 4. The output of gate 209' sets flip-flop E which turns on switches 2 and 3. Multi-vibrator M resets flip-flop D and E. All of the gates shown in FIG. 11 are "and" gates with the exception of gate 211'. Gate 211' is an "or" gate.

The logic, $S_A$, of the set input to flip-flop A is as follows:

$$S_A = \overline{A}C_p$$

Where $C_p$ is the clock pulse, the logic, $R_A$, of the reset input to flip-flop A, is as follows:

$$R_A = AC$$

The logic of the set and reset inputs of all the other flip-flops B, C, D, and E, are then as follows:

$$S_B = AB\overline{C}C_p$$
$$R_B = A\overline{C}C_p$$
$$S_C = A\overline{C}C_p$$
$$R_C = A\overline{C}C_p$$
$$S_D = \overline{AB}C_p - ABC_p$$
$$R_D = \overline{M}$$
$$S_E = \overline{BC}C_p$$
$$R_E = \overline{M}$$

In accordance with the foregoing, the logic for the set input to flip-flop D requires that flip-flop D be set at the end of period 1 in the table. It is reset before the end of period 2 by multi-vibrator M. Flip-flop D is again set at the end of period 2. Flip-flop D is again reset before the end of period 3 by multi-vibrator M.

Flip-flop E is set at the end of period 4. Flip-flop E is reset by multi-vibrator M before the end of period 5. Flip-flop E is again set at the end of period 5, and reset by multi-vibrator M before the end of period 6. Multi-vibrator M may have a manually adjustable delay by knob 212' to control the time width of the closures of switches 1, 2, 3, and 4. Delay device 210' is provided so that the zero output of multi-vibrator M will be low when the pulse output of delay device 210' is received by gates 201' through 209'.

What is claimed is:

1. In an inverter having first and second pairs of switches for connecting a DC source to two output terminals with alternate polarities and over certain intervals of time, a circuit for operating one pair of switches at a time, said circuit comprising: means for producing clock pulses at a substantially constant repetition rate; a digital counter adapted to reset on the count of six; first logic means responsive to the state of said counter for closing said first pair of switches for an interval between the first and second counts and for an interval between the second and third counts; and second logic means responsive to the state of said counter for closing said second pair of switches for an interval between the fourth and fifth counts and for an interval between the fifth and sixth counts, said first switch closures being spaced an amount of time equal to the clock pulse period, said second switch closures also being spaced an amount of time equal to the clock pulse period, all of said intervals being equal, the first first switch closure being spaced three clock pulse intervals from the first second switch closure.

2. The invention as defined in claim 1, wherein said first switches are first closed at said first and second counts, said logic means including delay means responsive to said clock pulses to turn said first switches off a predetermined time after each of said first and second counts, said delay means also being adapted to turn each of said second switches off after said fourth and fifth counts, said second switches being first closed at said fourth and fifth counts.

3. The invention as defined in claim 2, wherein said delay means is adjustable to vary the length of said time intervals.

References Cited
UNITED STATES PATENTS

| | | | |
|---|---|---|---|
| 3,324,374 | 6/1967 | Corey | 321—5 |
| 3,378,751 | 4/1968 | Walker | 321—18 |
| 3,423,662 | 1/1969 | Schlarbach | 321—9 XR |

WILLIAM M. SHOOP, Jr., Primary Examiner